Jan. 20, 1948.          J. A. MROSCO            2,434,670
                STUFFING BOX FOR ROTARY SPINDLES
                     Filed Sept. 8, 1944
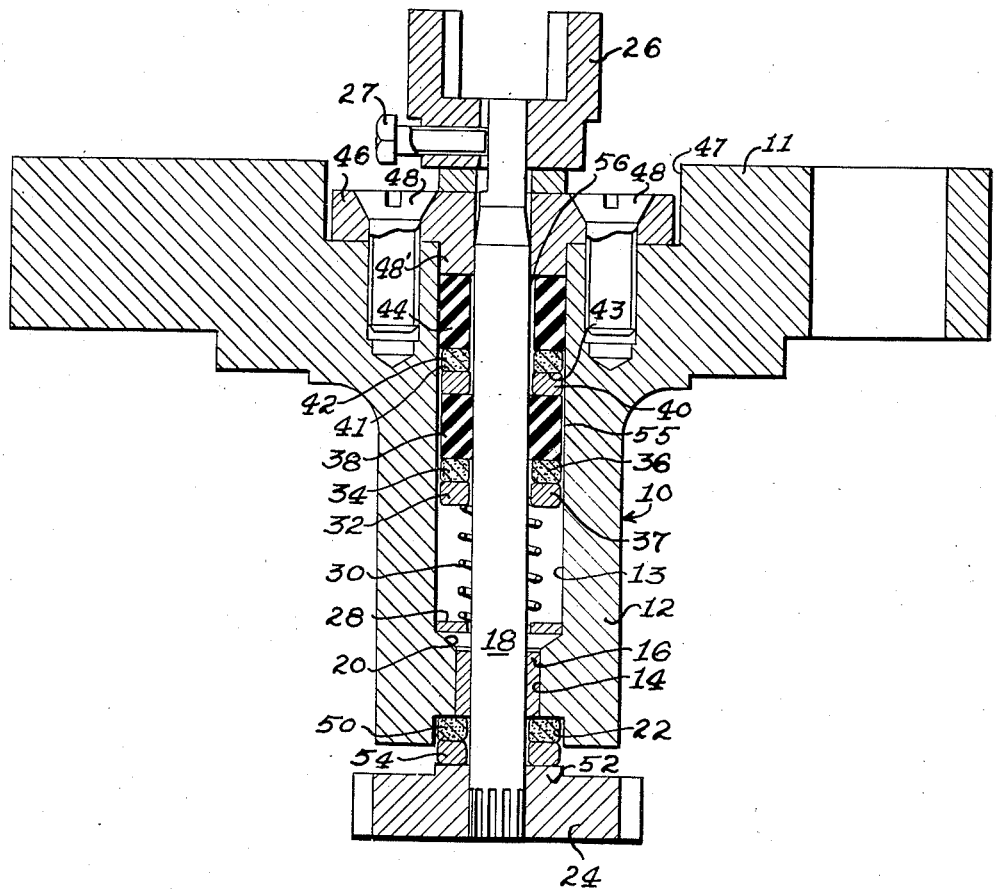
INVENTOR.
JOHN A. MROSCO
BY Strauch & Hoffman

UNITED STATES PATENT OFFICE 2,434,670

STUFFING BOX FOR ROTARY SPINDLES

John A. Mrosco, Forest Hills, Pa., assignor to Rockwell Manufacturing Company, a corporation of Pennsylvania Application September 8, 1944, Serial No. 553,205

1 Claim. (Cl. 286—7)

This invention relates to stuffing boxes for rotary spindles, shafts and the like and particularly to low friction stuffing boxes constructed and arranged for use in high fluid pressure apparatus.

In mechanism wherein it is necessary to provide a seal with a view to preventing leakage of water, oil, gasoline or other fluids through the bearing of a motion transmitting member such as a rotary shaft or spindle, the necessity for substantially reducing or effectively eliminating frictional resistance in the seal is usually very important. This is particularly true in relatively low power mechanisms such as fluid flow metering devices wherein the metering means may be subjected to varying pressures and changing drive forces, while accurate operation of a registering means under all conditions, as through a motion transmitting spindle, is desired.

It is the major object of the present invention to provide a novel fluid tight rotary spindle or shaft seal wherein friction is reduced to the extent that interference with accurate and efficient operation is eliminated.

Another object of the invention is to provide a novel spindle seal having improved fluid tight break motion means between relatively rotatable parts thereof.

Still another object of the invention is to provide a novel spindle stuffing box having relatively movable packing members, and fluid tight low friction break motion means between said packing members.

A further object of the invention is to provide a novel low friction fluid tight joint between two relatively rotatable parts wherein longitudinally spaced deformable packing members are sealed to the respective parts and wherein a slip connection is provided between those members of such nature as to prevent radial leakage of fluid. Pursuant to this object said slip connection includes mated and engaged planar surfaces rotatable and fluid tight with the respective members and maintained in engagement by spring loading of said deformable packing members.

A further object of the invention is to provide novel spindle packing means wherein a self-lubricating element is employed in a low friction break motion joint between relatively rotatable parts.

A still further object of the invention is to provide a novel stuffing box having relatively rotatable axially compressed packing and low friction slippage means interposed between the packing.

Still another object of the invention is to provide a novel low friction thrust bearing of improved construction.

These and further objects of the invention will fully appear upon a study of the following detailed description taken in conjunction with the accompanying drawing, wherein:

The figure in the drawing is an axial sectional view through a stuffing box illustrating a preferred embodiment of the present invention.

Referring to the drawing, a stuffing box and spindle sub-assembly 10 is carried by housing closure plate 11 having a downwardly extending integral boss 12. Plate 11 is adapted for connection with a meter housing the interior of which is under high hydraulic pressure and contains a movable element from which motion is to be transmitted to a register or the like outside the housing.

Plate 11 and boss 12 are formed with a central bore 13 of uniformly circular cross section. Adjacent its lower end, bore 13 is formed with a constricted portion providing a relatively short bore 14 of reduced diameter in which is fitted a cylindrical bushing 16 providing a radial bearing and lateral support for a rotatable cylindrical motion transmitting spindle 18. The upper end of the construction is preferably tapered as shown at 20 while the lower end forms an abrupt shoulder inwardly of an annular recess 22 in the lower end of boss 12.

That portion of spindle 18 which extends axially through bores 13 and 14 is of uniform diameter. A gear 24 is splined upon the lower end of spindle 18 beyond recess 22, and on the upwardly protruding end of spindle 18 is non-rotatably fastened a coupling member 26 as by a set screw 27. Obviously any suitable gearing or coupling elements may be substituted for gear 24 and coupling member 26. Spindle 18, gear 24 and coupling 26 rotate as a unit.

A rigid annular backing member 28, which may be a flat metallic washer, has a snug fit in the bore 13 above the tapered bore region 20. Washer 28 is disposed transversely to bore 13 and surrounds spindle 18 in spaced relation thereto. A coiled compression spring 30 surrounds spindle 18 out of contact therewith and has one end abutting backing washer 28 and its other end abutting an annulus 32 constituting a flat rigid steel washer surrounding spindle 18. Washer 32 has an internal diameter larger than spindle 18 and an external diameter less than that of bore 13 so that it may float radially between the spindle and the internal wall of the bore and be free from contact with either. The top of washer 32 opposite spring 30 is finished to provide a smooth highly polished or mirror planar bearing surface 34. The other side of washer 32 is not polished. Positioned against the upper finished side of washer 32 is a rigid flat bearing annulus or washer 36 which is also radially floating between bore 13 and spindle 18 and may be shaped in correspondence with the washer and having very low friction properties. This bearing element is preferably formed of a solid body of unctuous or self-lubricating material, such as relatively hard graphite, and its lower surface 37 is burnished to mirror finish in a plane for full face contact with surface 34 of steel washer 32. The plane of engagement of washers 32 and 36 is preferably normal to the axis of spindle 18.

Beyond washer 36, a tubular packing member 38 surrounds spindle 18 and constitutes an annular body of compressible material, such as soft rubber which is also highly resilient. Packing member 38 is of such size that prior to deformation during assembly its inner diameter is smaller than that of spindle 18 so that, when forced onto spindle 18, it will have fluid tight frictional grip thereon. The exterior diameter of packing member 38 is such as to maintain spaced running clearance with the inner wall of the bore 13. Packing member 38 is thus fixed in fluid tight relation upon spindle 18 and rotates therewith. Beyond packing member 38 is a second steel washer 40 preferably identical to washer 32 and having a smooth planar mirror finish face 41 in full face engagement with the smooth planar mirror finish face 43 of a second graphite or like washer 42 preferably identical with washer 36. The plane of engagement between washers 40 and 42 is preferably normal to the axis of spindle 18, and washers 40 and 42 are radially floating similarly to washers 32 and 36 and may assume positions out of contact with spindle 18 and bore 13.

Beyond washer 42 is mounted a second tubular packing member 44 comprising an annular resilient member differing from member 38 only in that in its normal expanded condition its exterior diameter is greater than that of the bore 13 so that, when forcibly assembled under compression therein, it is in fluid tight frictional engagement with the internal wall of bore 13. The inner diameter of member 44 is such as to maintain running clearance with spindle 18. Packing member 44, like member 38, is preferably an annular tube of soft rubber or the like.

A rigid packing gland 46 is secured in a recess 47 in the upper side of plate 11, as by bolts 48, and is formed with a tubular portion 48 extending into the end of bore 13 to abut the adjacent end of packing member 44. A suitable radially floating spacer collar 49, preferably a flat metal washer, is interposed between gland 46 and coupling member 26.

In the lower recess 22 is positioned a flat graphite or like bearing annulus 50, preferably identical with elements 36 and 42, surrounding the lower part of spindle 18. Between bearing annulus 50 and a boss 52 on gear 24 is interposed a third steel washer 54, preferably identical to washers 32 and 40. Elements 50 and 54 are radially floating with their contacting mirror finish surfaces having their plane of engagement normal to the axis of spindle 18 and provide a low friction thrust bearing.

When the above parts are operatively assembled, spring 30 reacts against stationary plate 38 and exerts loading pressure axially of spindle 18 sufficient to maintain the stuffing box members in such engagement as to prevent leakage of fluid through bore 13. Spring 30 forces the washer assembly 32, 36 against deformable member 38 which deforms axially of spindle 18 and presses washers 40 and 42 together and against deformable member 44 which is backed by gland 46.

Packing members 38 and 44 are affixed fluid tight to spindle 18 and bore 13, respectively, but provide annular spaces designated at 55 and 56 by reason of their running clearances with the bore and spindle, respectively. The association of the packing members with washers 40 and 42 prevents any interchange of fluid between spaces 55 and 56 while permitting substantially unimpeded rotation of spindle 18. The non-adjacent faces of washers 40 and 42 in contact with packing members 38 and 44, respectively, are not mirror smooth, and this circumstance coupled with the frictional nature of rubber bodies 38 and 44 provides that washer 40 tends to rotate with member 38 and shaft 18 while washer 42 tends to remain stationary with member 44 and boss 12, with consequent relative slippage between planar washer faces 34 and 37. This slippage is aided and increased by the self-lubrication afforded by graphite washer 42.

The spring loaded sealing engagement of soft rubber members 38 and 44 with the unfinished surfaces of washers 40 and 42 provides a radially fluid tight seal at these points, and the accurately planar surface engagement at 34, 37 which is maintained tight by the spring loading prevents passage of fluid radially thereof while permitting almost frictionless slippage of the surfaces due to their smoothness and the self-lubricating nature of the graphite washer 42.

If desired, washer 40 may be made rigid with packing member 38 and washer 42 rigid with packing member 44 prior to assembly, without departing from the spirit of the invention. In such arrangement, the washers will be permanently radially sealed with the adjacent rubber packing members and in operation the very small space between slippage surfaces 34 and 37 inhibits leakage of fluid therethrough.

The primary function of washers 32, 34 is to provide an axially directed spring loading arrangement which offers little frictional resistance to rotation of spindle 18. During rotation of spindle 18, washer 32 is effectively restrained against rotation by engagement with spring 30, while bearing annulus 36, which has its upper surface pressed against the lower end of packing member 38, tends to rotate with spindle 18. The smooth finished surfaces 34 and 37 are retained in close fitting slip contact to provide a low friction break motion connection. Thus spring 30 is enabled to exert adequate loading pressure axially of spindle 18 without substantially interfering with rotation of spindle 18.

Similarly, washer 54 engaging gear 24 rotates with the latter in slip contact with lubricant annulus 50 which tends to remain stationary with boss 12 and the bushing 16. This arrangement provides an excellent low friction thrust bearing for spindle 18.

It has been found, in practice, that the packing means described in the foregoing provides an effective seal while reducing frictional resistance on the spindle to the point that, for all practical purposes, resistance is eliminated as a factor bearing upon efficient operation of the pressure responsive mechanism driving the spindle and accurate registration thereof.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In combination with a stuffing box and a shaft extending through the bore thereof and an abutment face surrounding said shaft and closing one end of the bore; sealing means in said bore comprising a pair of axially spaced compressible packing members, one of said members contacting said abutment face having an exterior surface in fluid tight contact with the wall of said bore and a radially unsupported interior surface in clearance relation to said shaft, the other of said members having a radially unsupported exterior surface in clearance relation to the wall of said bore and an interior surface in fluid tight contact with said shaft, a pair of planar relatively rotatable rings interposed between and in contact with the end faces only of the respective packing members and having opposed low friction contact surfaces, the inner and outer peripheries of the respective rings being of equal axial dimension and having substantially the same clearance relation to said shaft and the wall of said bore as the respective packing members, an additional pair of planar rings having opposed low friction contact surfaces and in peripheral clearance relation to the wall of the bore and said shaft, one of the rings having contact with said other packing member, and a spring in the other end of said bore surrounding the shaft and exerting resilient thrust pressure against the other of said rings.

JOHN A. MROSCO.

REFERENCES CITED

The following references are of record in the file of this patent:

UNITED STATES PATENTS

| Number | Name | Date |
|---|---|---|
| 1,862,887 | Durdin | June 14, 1932 |
| 1,900,849 | Ackerman | Mar. 7, 1933 |
| 2,207,183 | Thrush | July 9, 1940 |
| 546,106 | Schmaltz | Sept. 10, 1895 |
| 2,131,544 | Weiland | Sept. 27, 1938 |

FOREIGN PATENTS

| Number | Country | Date |
|---|---|---|
| 288,940 | Great Britain | 1928 |